Nov. 23, 1954   F. BERRY   2,694,978
ROTARY POWER DEVICE OF THE ROTARY ABUTMENT TYPE
Filed Aug. 23, 1952   3 Sheets-Sheet 1
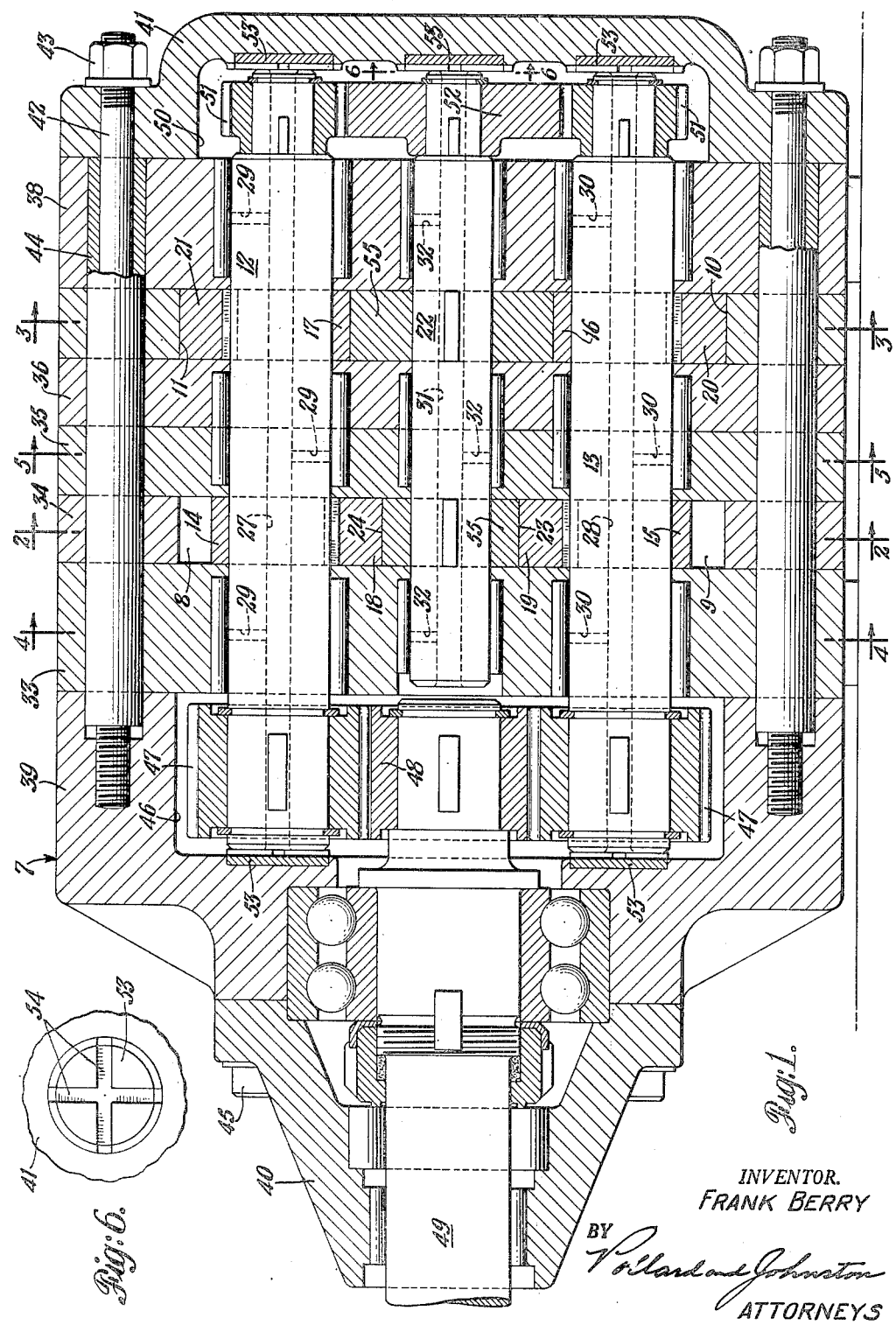
INVENTOR.
FRANK BERRY
BY
ATTORNEYS

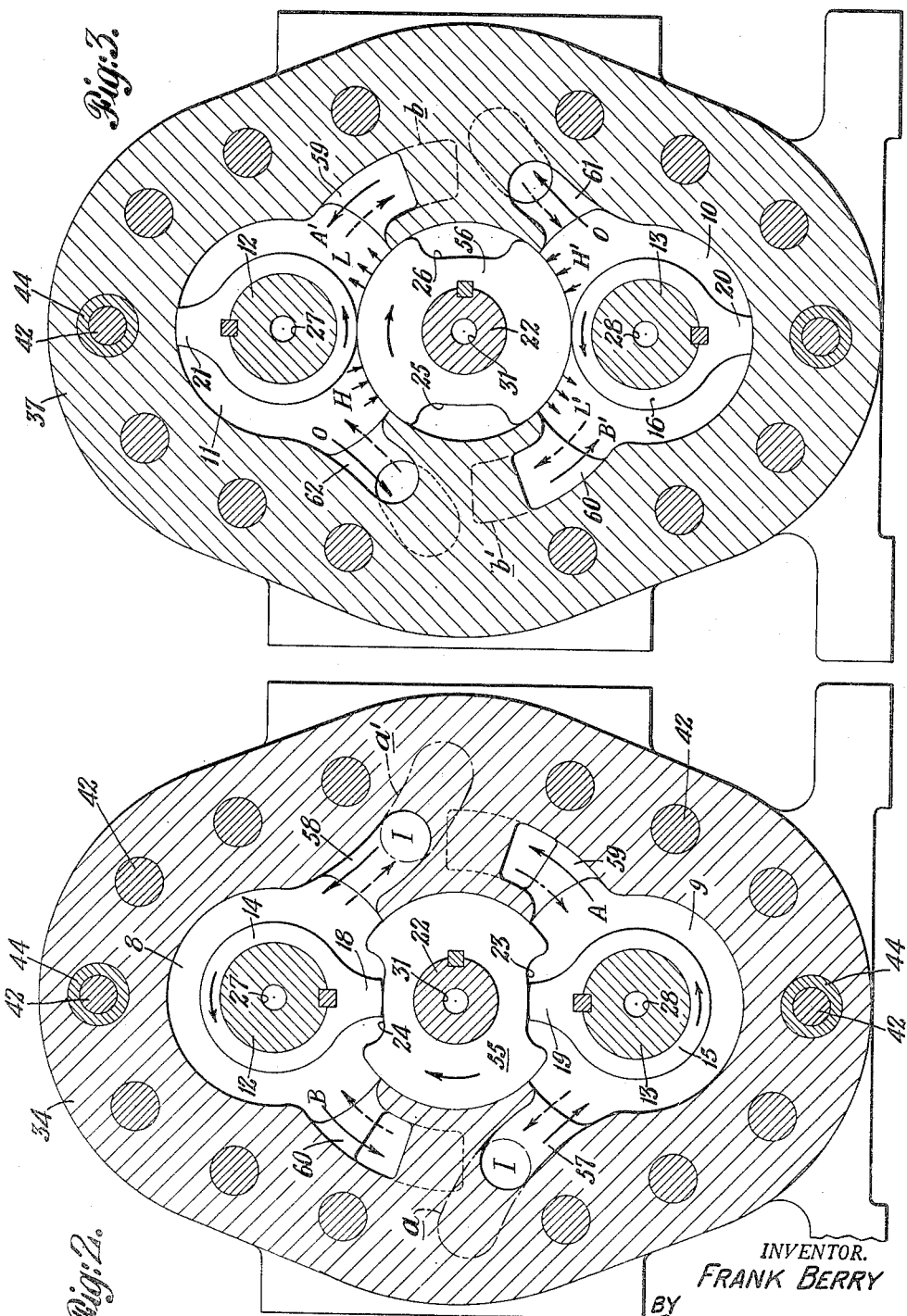

Nov. 23, 1954   F. BERRY   2,694,978
ROTARY POWER DEVICE OF THE ROTARY ABUTMENT TYPE
Filed Aug. 23, 1952   3 Sheets-Sheet 3
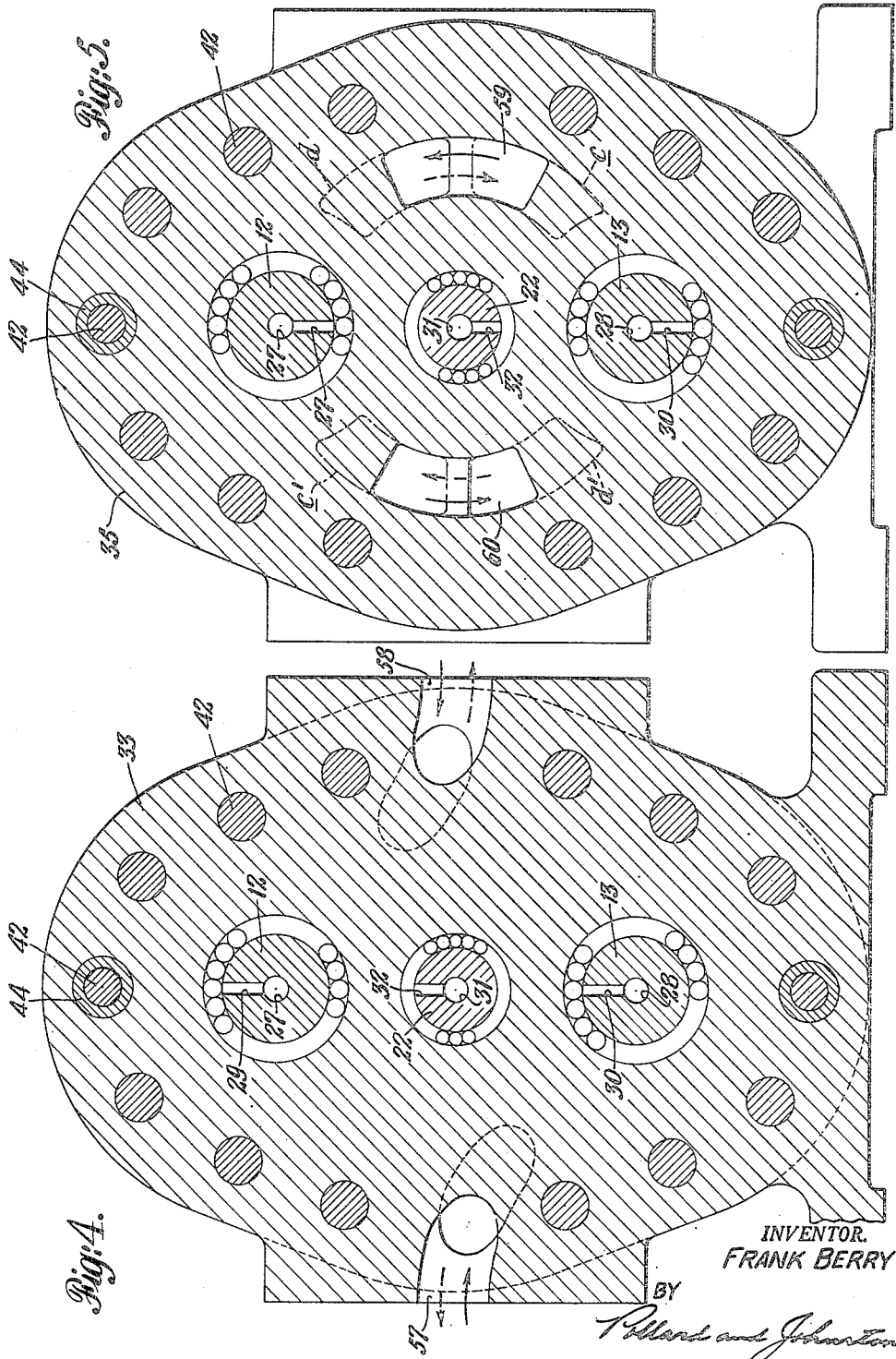
INVENTOR.
FRANK BERRY
BY
*Pollard and Johnston*
ATTORNEYS

United States Patent Office 2,694,978
Patented Nov. 23, 1954

2,694,978

ROTARY POWER DEVICE OF THE ROTARY ABUTMENT TYPE

Frank Berry, Corinth, Miss., assignor to Oliver Iron and Steel Corporation, Pittsburgh, Pa., a corporation of Pennsylvania Application August 23, 1952, Serial No. 306,000

2 Claims. (Cl. 103—4)

The invention relates to rotary fluid power devices of the rotary abutment type, and is applicable to hydraulic pumps, motors and transmissions, compressors, fluid expansion motors, etc.

Rotary abutment power units in general comprise a casing having annular cylinders, a rotor shaft carrying piston rotors with pistons slidably arranged to traverse the respective annular cylinders in rotary movement, and a rotary abutment arranged in the casing with its axis parallel to the axis of the rotor shaft, the abutment having recesses to clear the pistons as they pass the abutment. As examples of this general type of unit, reference is made to my prior Patents No. 2,464,481, granted March 15, 1949, and No. 2,536,486, granted January 2, 1951.

Summary

According to my invention, a pair of annular cylinders are arranged in a common plane at opposite sides of a rotary abutment valve with the pistons in such cylinders timed 180° apart, the cylinders being independent of communication with one another. Because the cylinders are not in communication with one another, we have, in effect, two independent units employing an abutment valve and other elements which are common to the two. This has the important result of equalizing, for all practical purposes, the fluid pressure on the abutment valve. What happens is that the fluid pressure on that part of the common valve which extends into one of the annular cylinders acts in opposition to the fluid pressure on that part of the valve which extends into the other annular cylinder. This reduces radial loading on the bearings of the abutment valve, permits the use of smaller bearings, and adds to the life of the unit by reducing wear.

With this balancing of fluid pressure on the abutment valve, it becomes practical to use a larger abutment valve because its area exposed to pressure is no longer significant. By using the larger abutment valve, as thus made practical, it then is possible to use longer pistons (longer radially). This in turn permits the pistons to be made narrower (narrower axially of the piston shaft), and a narrower piston means that the piston rotor can be narrower. Now as the piston rotor becomes narrower, assuming no change in its diameter, lateral pressure on the piston rotor is decreased. Thus, horsepower for horsepower, lower bearing loads can be achieved on the piston rotor shafts as well as on the abutment valve. Another advantage of this pressure balanced construction is that the abutment valve will run truer in its bore and as a result leakage around it will be reduced.

In the preferred form of my invention, I employ at least two pairs of annular cylinders, the cylinders of each pair being arranged in a common plane and the cylinders of one pair being aligned axially with the respective cylinders of the other pair. The pistons of each pair of cylinders are timed 180° apart from the pistons of the respective axially aligned cylinders of the other pair. The outlet of one cylinder of one pair is connected to the inlet of one cylinder of the other pair and the outlet of the other cylinder of the one pair is connected to the inlet of the other cylinder of the other pair. There are inlets to each of the two cylinders of the one pair, and outlets from each of the two cylinders of the second pair.

In this preferred construction the pistons of the first pair of cylinders are in their power stroke during approximately 180° of the cycle, and at this time the pistons of the second pair of cylinders are passing through the abutment valve and are not working. During the remaining 180° of the cycle the situation reverses, the pistons of the second pair of cylinders being in their power stroke, and those of the first pair are then passing through the valve and are not working. Thus each pair of pistons may be said to "valve" those of the other pair. However, the pistons of each pair are themselves independent of one another in their action except as they are geared together mechanically and as they produce opposed pressures on the common abutment valve. There is no fluid communication between them. Their inlets and outlets are not connected.

By my invention as applied more particularly to a hydraulic unit, I have secured the principal advantages of multi-cylinder operation in which one cylinder "valves" another for continuous flow with minimum pulsation, yet I have avoided the unbalanced pressures heretofore encountered in such units, by "cross-compounding," or perhaps more properly, cross-valving, two pairs of independent cylinders using a common abutment.

Description

In the drawings, which illustrate what I now consider to be the preferred form of my invention as applied to a pump or motor:

Fig. 1 is a vertical longitudinal cross-sectional view illustrating the general arrangement;

Fig. 2 is a vertical transverse cross-sectional view through a pair of annular cylinders taken as indicated at 2—2 in Fig. 1;

Fig. 3 is a similar view taken on the line 3—3 of Fig. 1;

Fig. 4 is a vertical transverse cross-sectional view taken on the line 4—4 of Fig. 1;

Fig. 5 is a similar view taken on the line 5—5 of Fig. 1; and

Fig. 6 is a detail view of a thrust bearing member taken as indicated at 6—6 in Fig. 1.

In the description of the drawings to follow, I shall for the sake of simplicity, generally refer only to pumps but it should be understood that the constructions described may be operated as motors. Further, the invention to be described is applicable to fluid power units in general, inclusive of units in which the operating fluid is compressible or expandible, as well as units in which the operating fluid is non-compressible. Included in the first category are air motors, compressors and expanders, and included in the second category are hydraulic pumps, motors, transmissions, etc. In the case of units in which the fluid is compressible, the basic unit described can be staged or compounded in known manner and may utilize the principles and invention of my prior Patent No. 2,447,929, granted August 24, 1948, the disclosure of which is here incorporated by reference. Therefore it will be understood that the invention disclosed herein is applicable to rotary fluid power devices of the rotary abutment type in general inclusive of hydraulic pumps, motors and transmissions, compressors, fluid expansion motors and so on; also that the mechanism selected as illustrative of my preferred embodiment is properly to be regarded as either a hydraulic pump or motor or as a component of hydraulic transmissions or power converters embodying such pumps or motors.

This preferred construction comprises in its general arrangement a casing 7 made up of a series of plates, this casing having axially arranged pairs of annular cylinders 8 to 11 inclusive, rotor shafts 12 and 13 carrying piston rotors 14 to 17 inclusive with pistons 18 to 21 inclusive slidably arranged to traverse the respective annular cylinders in rotary movement, and a rotary abutment 22 arranged in the casing with its axis parallel to the axis of the rotor shafts 12, 13, the abutment having recesses 23 to 26 inclusive to clear the pistons as they pass the abutment. Ducts 27, 29, and 28, 30 connect the low-pressure side of the interfaces of each cylinder and piston rotor with the low-pressure side of the interfaces of the next adjacent, axially aligned, cylinder and piston rotor. Ducts 27 and 28 preferably extend entirely through the respective shafts 12 and 13, the connecting ducts 29 and 30 extending transversely through the shafts from ducts 27 and 28 to the shaft bearings.

The piston rotor rings 14 to 17 inclusive and the abutment rings 55, 56 preferably are formed separately from their respective shafts so as to facilitate assembly of the unit and also to permit relative movement between the rings and the shafts for individual centering of the respective rings. However I do not wish to be limited to this particular construction as it is possible in certain types of units to employ pistons which are formed as integral parts of the shaft and/or an abutment member in which the recesses to clear the pistons are formed directly in the shaft as distinguished from forming them in separate or integral rings on the abutment shaft.

Ducts 31, 32 in abutment shaft 22 connect the low-pressure side of the bearing surfaces of each abutment ring with the low-pressure side of the bearing surfaces of the next adjacent abutment ring. These ducts, and also the ducts 27 to 30 inclusive previously described, may either extend through the respective abutment and piston shafts as shown, or if desired they may extend through the casing or through the piston and abutment rings (as distinguished from the shafts therefor). These duct arrangements are similar to those disclosed in my copending application Serial No. 218,670, filed March 31, 1951, and their purposes and advantages are there described more fully. Such ducts have been illustrated in the drawings of my preferred form for the purpose of completeness. These ducts may, if desired, be omitted without sacrificing the beneficial effects of the particular improvements described in the present application.

Casing 7 is built up of a series of flat plates 33 to 38 inclusive (Fig. 1). The outer cylindrical walls of the cylinders are formed by the plates 34 and 37, and the side walls of the cylinders are formed by the plates 33, 35, 36 and 38. The casing assembly is completed by end casing members 39, 40 and 41. Casing members 33—39 and 41 are secured together in proper alignment by means of a series of stud bolts 42 and nuts 43, these bolts extending through aligned openings in the several casing members and being screw-threaded into end casing member 39. As may be seen in Figs. 2 and 3, a number of the bolts 42 extend through aligning sleeves 44. End casing member 40 is suitably secured to the assembly by means of cap screws or stud bolts 45. Casing member 39 is recessed at 46 to receive pinions 47 fixed to the ends of rotor shafts 12 and 13 and pinion 48 fixed to the end of drive shaft 49. In the embodiment illustrated, pinions 47 and 48 are intermeshed to gear the rotor and drive shafts together in 1:1 ratio. End casing member 41 is recessed at 50 to receive pinions 51 fixed to the ends of rotor shafts 12 and 13, and pinion 52 fixed to the end of abutment shaft 22. In the embodiment illustrated, pinions 51 and 52 are intermeshed to gear the rotor and abutment shafts together in 2:1 ratio so that the piston rotors make two revolutions for each revolution of the abutment. End casing members 39 and 40 enclose suitable bearings and stuffing box structure as clearly shown in Fig. 1. Also, suitable thrust bearings are provided in the end casing members 39 and 41. These may be plain bronze bearings of the general form shown at 53 in Figs. 1 and 6 carried in recesses in end case members 39 and 41. These bearings are provided with transverse channels or grooves 54 in their bearing faces. The grooves 54 permit oil or other lubricating fluid to circulate freely between the ends of the ducts 27, 28 and 31 in the rotor and the abutment shafts to the bearings and the interfaces of the cylinders, piston rotors and abutment rotors.

In the case of a pump, the drive shaft 49 is driven from an external source of power, and in the case of a motor, this shaft is the driven shaft of the hydraulic motor, which in the latter case constitutes the prime mover. Details of the bearing and stuffing box structures need not be described as these may be of any well-known construction. Suitable anti-friction bearings may, if desired, also be provided in intermediate plate members 33, 35—36, and 38, such as the roller bearings clearly shown in Figs. 1, 4 and 5 for the rotor and abutment shafts.

Referring particularly to Fig. 2, it will be observed that the construction described comprises a pair of annular cylinders 8 and 9 arranged in a common plane at opposite sides of a rotary abutment valve 55 with the pistons in such cylinders timed 180° apart, the cylinders being independent of communication with one another. Also the preferred form of my invention comprises a second pair of annular cylinders 10 and 11 seen in Fig. 3, similarly arranged at opposite sides of the rotary abutment valve, again with the pistons in such cylinders timed 180° apart and the cylinders being independent of communication with one another. Thus the pistons of the two cylinders in each pair are arranged substantially 180° apart, and the pistons of the one pair of cylinders also are arranged substantially 180° apart from the pistons of the respective axially aligned cylinders of the other pair.

Referring now to Fig. 4, there are fluid inlets-outlets 57 and 58 (both will be inlets or both outlets, depending upon *a* the direction of rotation and *b* whether the unit is being operated as a pump or as a motor) communicating with the respective cylinders shown in Fig. 2, and a continuation of these inlets-outlets is shown in the latter view. Since in our description we are regarding the unit as in operation as a pump, and if we also assume that the piston rotors are being driven in counter-clockwise rotation as shown by the arrows superimposed thereon, passages 57 and 58 are functioning as inlets, and the flow of fluid through the unit would be as indicated by the full line arrows. (The dotted line arrows indicate the direction of flow when the unit is reversed.)

Referring now to Figs. 2 and 3, it will be observed that passage 59 comprises the outlet from cylinder 9 of the first pair and the inlet to cylinder 11 of the second pair. Similarly passage 60 comprises the outlet from cylinder 8 of the first pair and the inlet to cylinder 10 of the second pair. Outlets 61 and 62 from the cylinders 10 and 11 of the second pair extend out through casing member 38 in a manner similar to the arrangement shown in Fig. 4 for the inlets to the cylinders of the first pair. The dot and dash lines *a* and *a'* in Fig. 2 show the outlines of passage 57 and 58 at that face of plate 34 which is toward the reader from the plane of the section taken. Similarly, the dot and dash lines *b* and *b'* in Fig. 3 show the outlines of passages 59 and 60 at that face of plate 37 which is toward the reader from the plane of the section taken. In Fig. 5 the dot and dash lines *c* and *c'* show the outlines of passages 59 and 60 at that face of plate 35 which is toward the reader from the section taken; and the dotted lines *d* and *d'* show the outlines of passages 59 and 60 at that face of plate 36 which is away from the reader with respect to the section taken. Thus, dot and dash lines are used to indicate structure in a plane which is in front of the plane of the drawing, whereas dotted lines indicate structure behind the plane of the drawing as is conventional in patent drawings.

It will now be understood that cylinder 8 of the first pair is in communication with cylinder 10 of the second pair while cylinder 9 of the first pair is in communication with cylinder 11 of the second pair. Thus in operation the even-numbered cylinders supplement one another, and the odd-numbered cylinders supplement one another. With the parts in the operating positions shown in Figs. 2 and 3, pistons 18 and 19 are passing through the recesses of the abutment valve, and are not pumping, while pistons 20 and 21 are at the mid-point of their operating strokes, and are pumping. The pumping stroke of all four pistons is substantially 180° in extent. Therefore the actions of pistons 18 and 20 are supplementary, each piston working half of the time. The same is true with respect to pistons 19 and 21. After the piston rotor shafts have rotated 180° from the positions shown and abutment shaft 22 is rotated 90°, pistons 20 and 21 will be idling or valving through the abutment, and pistons 18 and 19 will be in the middle of their working strokes. Thus the conditions described with reference to Figs. 2 and 3 are exactly reversed.

Throughout the cycle each piston is operating for approximately 50% of the time and during the time that the piston of a supplementary cylinder is valving through the abutment. In this way pistons 18 and 20 valve each other, pistons 19 and 21 valve each other, and continuous streams of liquid are caused to flow through the unit with a minimum of pulsation. This continuous flow feature is described more fully and is claimed in my copending application for patent Serial No. 123,503, filed October 25, 1949, now Patent No. 2,614,503.

When the pistons of either pair are idling, or valving, through the abutment, pressure is uniform on the peripheral surface of abutment rotor 55. This is the condition illustrated in Fig. 2, and is due to the fact that pressure is the same on each side of the pistons when they are not working and there is free flow of fluid through the cylinders. On the other hand, when the pistons of either pair are pumping, we have a condition which sets up a pressure differential within each cylinder, with a high pressure (as indicated by the arrows H, H' in Fig. 3) on the outlet sides of the cylinders and a low pressure (as indicated by the arrows L, L') on the inlet sides of the cylinders. However, fluid pressure at H on the cylindrical surface of rotary abutment 56 within cylinder 11 acts in opposition to the fluid pressure at H' on the cylindrical surface of the rotary abutment within cylinder 10. Similarly, fluid pressure (or vacuum) at L on the cylindrical surface of the rotary abutment within cylinder 11 acts in opposition to the fluid pressure (or vacuum) at L' on the cylindrical surface of the rotary abutment within cylinder 10. When the cylinders of each pair are of substantially the same size or capacity, fluid pressure on the abutment valve will be substantially equalized.

In the construction described, we have what may generally be referred to as a "two place" unit. What this means is that there are two parallel streams flowing through the unit. Were one of the streams to be recirculated through a suitable by-pass, we would no longer have the equalization of pressures I have described. However it is perfectly feasible to utilize any multiple of the pair of annular cylinders 8 and 9 with appropriate valving means therefor, such as provided for example by the supplementary cylinders 10 and 11, or to provide any multiple of the two pairs of annular cylinders (i. e. four pairs, six pairs, eight pairs, etc.). The inlets and outlets 57, 58 and 61, 62 of the several pairs of cylinders, or several places, of the unit described, are connected through suitable manifolds to a common fluid intake and a common point of fluid delivery. The unit will be connected to an external source of fluid pressure or to a device utilizing fluid pressure, as the case may be, and depending upon whether the unit is being operated as a motor or as a pump. The unit may be designed for simultaneous operation of all of the pairs of cylinders in parallel or it may be designed for selective operation of any multiple of the basic two pairs of cylinders as may be desired to meet a given load condition. This selective operation may be controlled either manually, or automatically, as for example with the use of the type of automatic control disclosed and claimed in my prior Patent No. 2,536,486, granted January 2, 1951. Inasmuch as these fluid controls do not form a part of my present invention, it will be unnecessary to describe them in more detail here.

In the case of units designed for operation with, or on, compressible fluids, it is preferable to use cylinders of larger cross-sectional area, or capacity, for one of the pairs than for the other. This may be very simply done by making plate 37 thicker than plate 34 (see Fig. 1) and similarly making the pistons 20 and 21, piston rotors 16 and 17, and abutment rotor 56 of correspondingly greater width in order to fit the wider cylinders thus provided. Also, the passages 61 and 62 will be proportionately increased in size and the passages 59 and 60 may be tapered so as to be of progressively increasing diameter between the supplementary cylinders 9, 11 and 8, 10 respectively. In this respect the unit will utilize the invention and principles of my prior Patent No. 2,447,929, granted August 24, 1948.

The terms and expressions which I have employed are used in a descriptive and not a limiting sense, and I have no intention of excluding such equivalents of the invention described, or of portions thereof, as fall within the purview of the claims.

I claim:

1. A rotary fluid power device comprising two pairs of annular cylinders, the cylinders of each pair arranged in a common plane and the cylinders of one pair being aligned axially with the respective cylinders of the other pair, a pair of shafts rotatable about spaced parallel axes located centrally of the annular cylinders, pistons fixed to each of said shafts for slidable movement in said cylinders, a rotary abutment between said shafts having a cylindrical outer surface intersecting the cylindrical outer surfaces of said annular cylinders, said rotary abutment having two pairs of diametrically opposed recesses therein to clear the pistons as they pass the abutment, said two pairs of recesses being arranged at approximately right angles to one another, the pistons of the cylinders of each pair being arranged substantially 180° apart and the pistons of one pair being arranged substantially 180° apart from the pistons of the respective axially aligned cylinders of the other pair, the outlet of one cylinder of one pair being connected to the inlet of one cylinder of the other pair and the outlet of the other cylinder of the one pair being connected to the inlet of the other cylinder of the other pair, and the inlet and outlet of one cylinder of each pair being independent of communication with the inlet and outlet of the other cylinder of the pair whereby fluid pressure on the cylindrical surface of the rotary abutment within one cylinder of each pair acts in opposition to fluid pressure on the cylindrical surface of the rotary abutment within the other cylinder of the pair.

2. A rotary fluid power device as defined by claim 1 in which a multiple of the pairs of annular cylinders, pistons and associated inlets and outlets set forth is employed, the multiples being connected together in parallel, and in which the inlet and outlet of one cylinder of each pair is independent of communication with the inlet and outlet of the other cylinder of the pair.

References Cited in the file of this patent

UNITED STATES PATENTS

| Number | Name | Date |
|---|---|---|
| 1,037,455 | Diefenderfer | Sept. 3, 1912 |
| 1,485,414 | Junkers | Mar. 4, 1924 |
| 2,464,481 | Berry | Mar. 15, 1949 |
| 2,495,088 | Berry | Jan. 17, 1950 |

FOREIGN PATENTS

| Number | Country | Date |
|---|---|---|
| 458,408 | France | Aug. 6, 1913 |
| 793,304 | France | Nov. 16, 1935 |